US006343900B1

(12) United States Patent
Bruno

(10) Patent No.: US 6,343,900 B1
(45) Date of Patent: Feb. 5, 2002

(54) TWO-SPEED PNEUMATIC MACHINE TOOL

(75) Inventor: Piergiacomi Bruno, Yerres (FR)

(73) Assignee: Recoules S.A., La Ferriere (FR)

( * ) Notice: Subject to any disclaimer, the term of this patent is extended or adjusted under 35 U.S.C. 154(b) by 0 days.

(21) Appl. No.: 09/478,536

(22) Filed: Jan. 6, 2000

(30) Foreign Application Priority Data

Jan. 6, 1999 (FR) ............................................. 99 00062

(51) Int. Cl.$^7$ ............................................. B23B 39/10
(52) U.S. Cl. ........................ 408/124; 408/17; 408/132; 408/139; 408/702
(58) Field of Search ................................. 408/124, 130, 408/132, 139, 241 S, 702, 17; 192/3.32, 3.55, 20, 30 R; 74/1 R, 34, 333

(56) References Cited

U.S. PATENT DOCUMENTS

| | | | | |
|---|---|---|---|---|
| 3,680,613 A | * | 8/1972 | Daniels et al. | 144/209 R |
| 3,838,934 A | * | 10/1974 | Petroff | 408/7 |
| 3,908,492 A | * | 9/1975 | Roskelley | 82/29 R |
| 4,147,219 A | * | 4/1979 | Wallace | 173/12 |
| 4,484,871 A | * | 11/1984 | Adman et al. | 418/69 |
| 4,648,756 A | * | 3/1987 | Alexander et al. | 408/9 |
| 4,808,047 A | * | 2/1989 | Calevich et al. | 408/14 |
| 4,916,975 A | * | 4/1990 | Combastet | 475/111 |
| 4,957,398 A | * | 9/1990 | Schneider et al. | 409/136 |
| 5,011,341 A | * | 4/1991 | DeGroff | 408/124 |
| 5,022,798 A | * | 6/1991 | Eckman | 408/1 R |
| 5,073,068 A | * | 12/1991 | Jinkins et al. | 408/17 |
| 5,269,733 A | * | 12/1993 | Anthony, III | 475/331 |
| 5,607,266 A | * | 3/1997 | Anderson | 408/124 |
| 6,093,130 A | * | 7/2000 | Buck et al. | 475/298 |

FOREIGN PATENT DOCUMENTS

| | | | |
|---|---|---|---|
| DE | 19 57 511 | | 5/1971 |
| DE | 25 41 780 | | 3/1977 |
| DE | 3538121 A1 | * | 4/1987 |
| DE | 3736413 A1 | * | 5/1989 |
| EP | 0 685 296 | | 12/1995 |
| JP | 57184613 | * | 11/1982 |
| JP | 5914412 | * | 1/1984 |
| JP | 3-178764 | | 8/1991 |

* cited by examiner

Primary Examiner—A. L. Wellington
Assistant Examiner—Monica Carter
(74) Attorney, Agent, or Firm—Young & Thompson

(57) ABSTRACT

This pneumatic machine tool includes a driving shaft (14) driven in rotation by pneumatic drive means (12), a driven tool-carrier shaft (16), a gear mechanism (18) disposed between the driving shaft and the driven shaft to drive the latter, a set of sensors (22) for measuring operating parameters of the machine tool, and a central control unit (20) in which are stored algorithms for controlling machining as a function of data received from the sensors, the gear mechanism including means (24, 26, 28, 30) for changing the gear ratio. The gear mechanism includes primary and secondary sets (24, 26) of toothed wheels with different demultiplication ratios, each adapted to rotate freely relative to the driving shaft (14). The speed changing means include a positive clutch (28) constrained to rotate with the driving shaft (14) and axially mobile relative thereto between two end positions in which the positive clutch (28) is engaged with respective sets of toothed wheels (24, 26).

7 Claims, 5 Drawing Sheets

TWO-SPEED PNEUMATIC MACHINE TOOL

BACKGROUND OF THE INVENTION

The present invention relates to a pneumatic machine tool particularly suitable for use in the aeronautical industry.

DESCRIPTION OF THE RELATED ART

Pneumatic machine tools are in very widespread use and are often preferred to electrically driven machine tools because of their performance.

One type of prior art pneumatic machine tool includes a driving shaft driven in rotation by pneumatic drive means, a driven tool-carrier shaft, a gear mechanism disposed between the driving shaft and the driven shaft to drive the latter, a set of sensors for measuring operating parameters of the machine tool, and a central control unit in which are stored algorithms for controlling machining as a function of data received from the sensors, the gear mechanism including means for changing the gear ratio under the control of the central unit.

The operation of this type of machine tool can be adapted to start predetermined operating cycles such as the lubrication of a shaft carrying the tool, safety cycles, cycles for advancing and withdrawing the tool as a function of the depth of the bore when the machine tool is used as a drilling machine, etc., as a function of operating parameters of the machine tool supplied by the sensors, for example the position of the tool relative to the workpiece to be machined, the type of tool, etc.

SUMMARY OF THE INVENTION

The object of the invention is to provide a machine tool of the aforementioned type which is additionally capable of starting preprogrammed operating cycles at two different speeds as a function of machining parameters.

It therefore consists in a pneumatic machine tool of the aforementioned type characterized in that the gear mechanism includes primary and secondary sets of toothed wheels with different demultiplication ratios, each adapted to rotate freely relative to the driving shaft, the speed changing means including a positive clutch constrained to rotate with the driving shaft and axially mobile relative thereto under the control of a pneumatic control unit controlled by the central unit, between two end positions in which the positive clutch is engaged with respective sets of toothed wheels.

The machine tool in accordance with the invention can also have one or more of the following features, individually or in all technically feasible combinations:

- the secondary set of toothed wheels is part of the primary set of toothed wheels;
- the positive clutch has radial teeth on opposite end faces of the positive clutch adapted to cooperate with complementary radial teeth carried by one of the toothed wheels of each set of toothed wheels;
- the pneumatic control unit includes a piston fastened to the positive clutch and mobile in a chamber and means for supplying the chamber with pressurized fluid on either side of the piston, including a solenoid valve under the control of the central unit;
- at least part of the gear mechanism is removable from the machine and constitutes an interchangeable modular assembly;
- the central unit has stored in its memory an algorithm for monitoring the rotation speed of the driven shaft by comparing the actual rotation speed of the driven shaft and maximum and minimum permissible rotation speeds between which lies the rotation speed imposed by the central unit;
- the primary set of toothed wheels is a speed multiplier or reducer.

BRIEF DESCRIPTION OF THE DRAWINGS

Other features and advantages will emerge from the following description which is given by way of example only and with reference to the accompanying drawings, in which.

DESCRIPTION OF THE PREFERRED EMBODIMENTS

Figure 1:
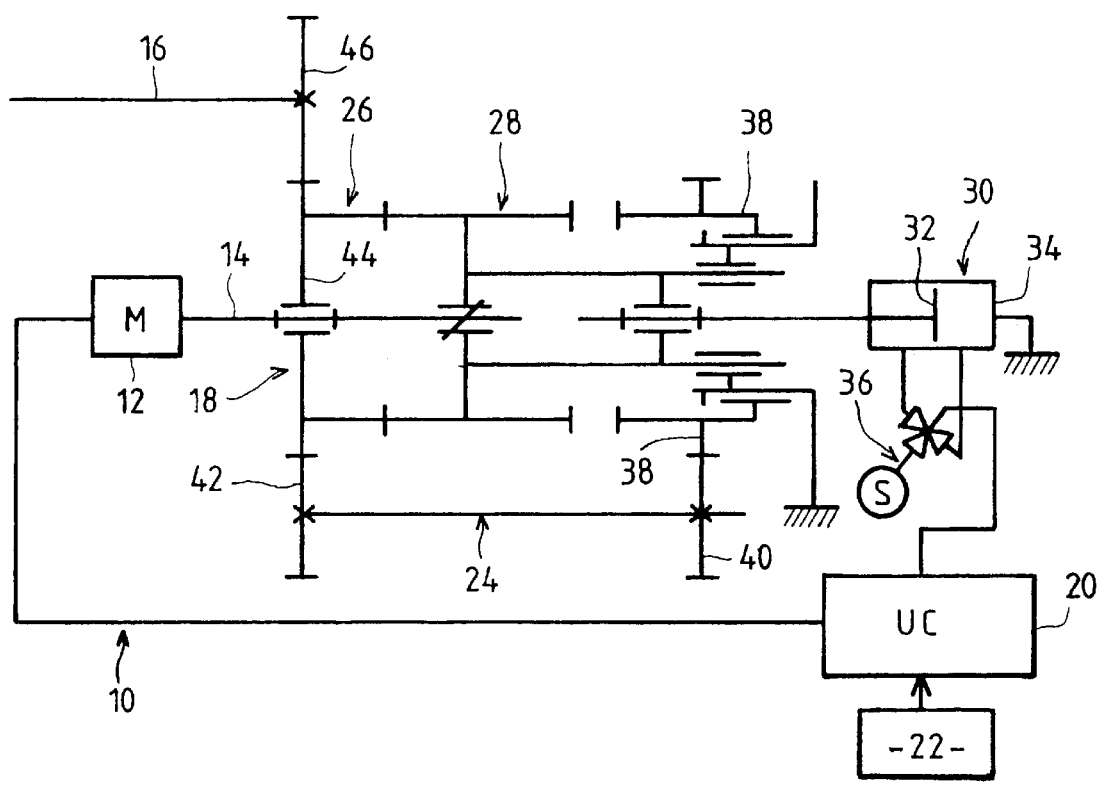
FIG. 1 is a diagrammatic view showing the structure of the machine tool in accordance with the invention.

FIG. 1 shows the symbolic structure of a pneumatic machine tool in accordance with the invention. The machine tool 10 includes a pneumatic motor 12, a driving shaft 14 driven in rotation by the motor 12, a driven tool-carrier shaft 16 and a gear mechanism 18 disposed between the driving shaft 14 and the driven shaft 16 to drive the latter in rotation.

A central processor unit 20 in which is stored a set of algorithms for controlling machining as a function of operating parameters of the machine tool supplied by a set of sensors 22 and parameters representative of the tool type controls the various functional units of the machine tool and the rotation of the pneumatic motor 12.

The gear mechanism 18 includes two toothed wheel trains 24 and 26 respectively constituting a primary set of toothed wheels and a secondary set of toothed wheels.

The primary set 24 of toothed wheels drives the tool-carrier shaft 16 in rotation at a first rotation speed V1 with a predetermined demultiplication ratio set by the configuration of the wheels 24 and equal to 1/3, for example.

The secondary set 26 of toothed wheels drives the tool-carrier shaft 16 in rotation at a second rotation speed V2 with a different demultiplication ratio, for example 1/1.

The primary and secondary sets of toothed wheels are both able to rotate freely relative to the driving shaft 14. A positive clutch 28 constrained to rotate with the driving shaft 14 and mobile axially relative thereto under the control of a pneumatic actuator unit 30 controlled by the central unit 20 selectively engages with one or other of the sets of toothed wheels as a function of a required drive speed V1 or V2.

The positive clutch 28 is mobile relative to the driving shaft 14 between two extreme positions in which it is engaged with the respective sets of toothed wheels. In FIG. 1, the positive clutch 28 is engaged with the secondary set 26 of toothed wheels and therefore drives the driven shaft 16 at the second rotation speed V2.

The pneumatic actuator unit 30 includes a piston 32 constrained to move in translation with the positive clutch 28 and mobile within a chamber 34 provided with means for feeding a fluid under pressure to either side of the piston 32 under the control of a solenoid valve 36 controlled by the central unit 20 and fed with fluid under pressure from a supply S.

FIG. 1 shows that the primary and secondary sets of toothed wheels constitute a common train of toothed wheels and are part of the same kinematic system, the positive clutch 28 short-circuiting a portion of the primary train when it is directly engaged with the secondary set 26 of toothed wheels.

When it is necessary to change speed, for example from the speed V2 to the speed V1, starting from the position shown in FIG. 1 in which the driven shaft 16 is driven by the secondary set 26, the central unit 20 causes the solenoid valve 36 to inject fluid from the supply S into the lefthand part of the chamber 34. The resulting displacement of the piston 32 displaces the positive clutch 28 which engages with the primary set 24 of toothed wheels, so bringing about a change of speed.

To change the speed from the speed V1 to the speed V2, starting from a position in which the driven shaft 16 is driven by the primary set, which incorporates the secondary set, the fluid under pressure has to be injected into the righthand part of the chamber 34, which displaces the positive clutch 28, which engages directly with the secondary set 26 of toothed wheels.

As previously mentioned, the primary set 24 of toothed wheels reduces the rotation speed of the driving shaft 14 and the secondary set 26 of toothed wheels transmits the rotation of the driving shaft 14 with a different demultiplication ratio, for example 1/1.

Of course, as an alternative to the above, it is possible to modify the configuration of the primary set of toothed wheels in order to transmit the rotation of the driving shaft 14 with a different demultiplication ratio, for example 3/1, enabling the use of a pneumatic motor 12 having a lower speed for the same power, and distribution of the loads on the bearings accordingly.

The gear mechanism will now be described in detail with reference to FIGS. 2 to 4. These figures do not show the central unit 20, the sensors or the means controlling the supply of fluid under pressure to the chamber 34.

Figure 2:
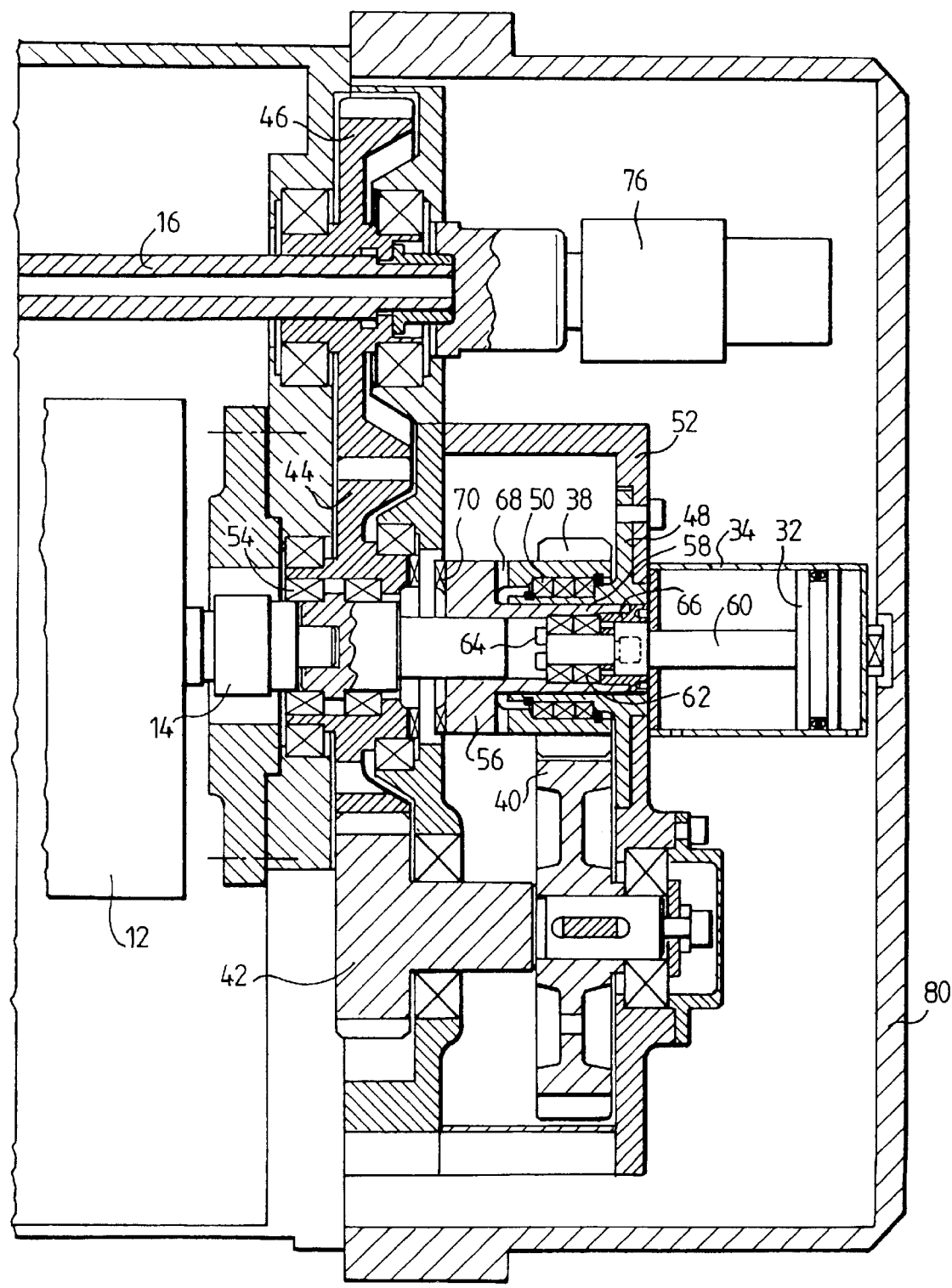
FIG. 2 shows a detail of the machine tool in accordance with the invention and shows the gear mechanism in a first position.
Figure 3:
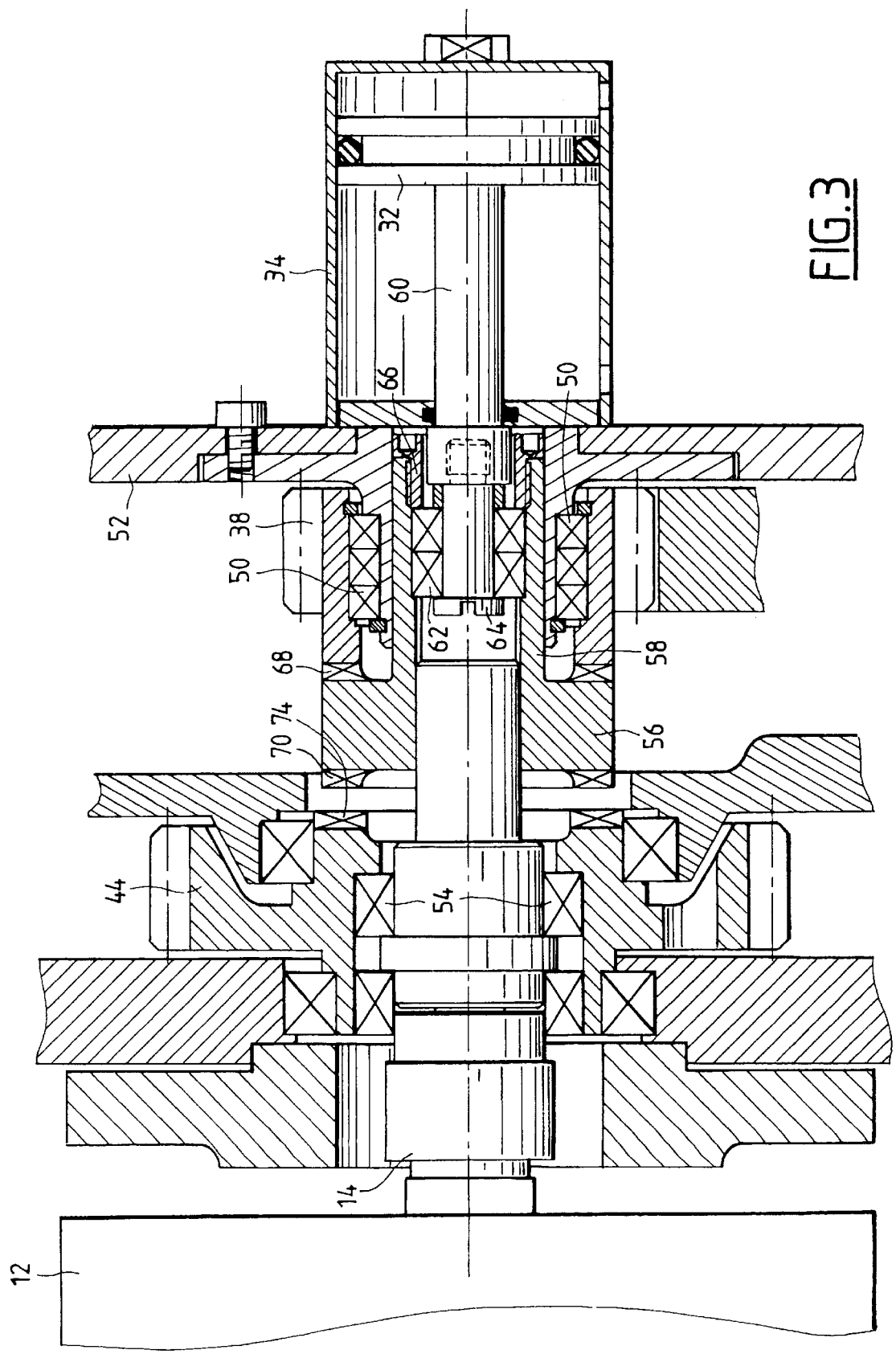
FIG. 3 is a view of the gear mechanism shown in FIG. 2 to a larger scale.
Figure 4:
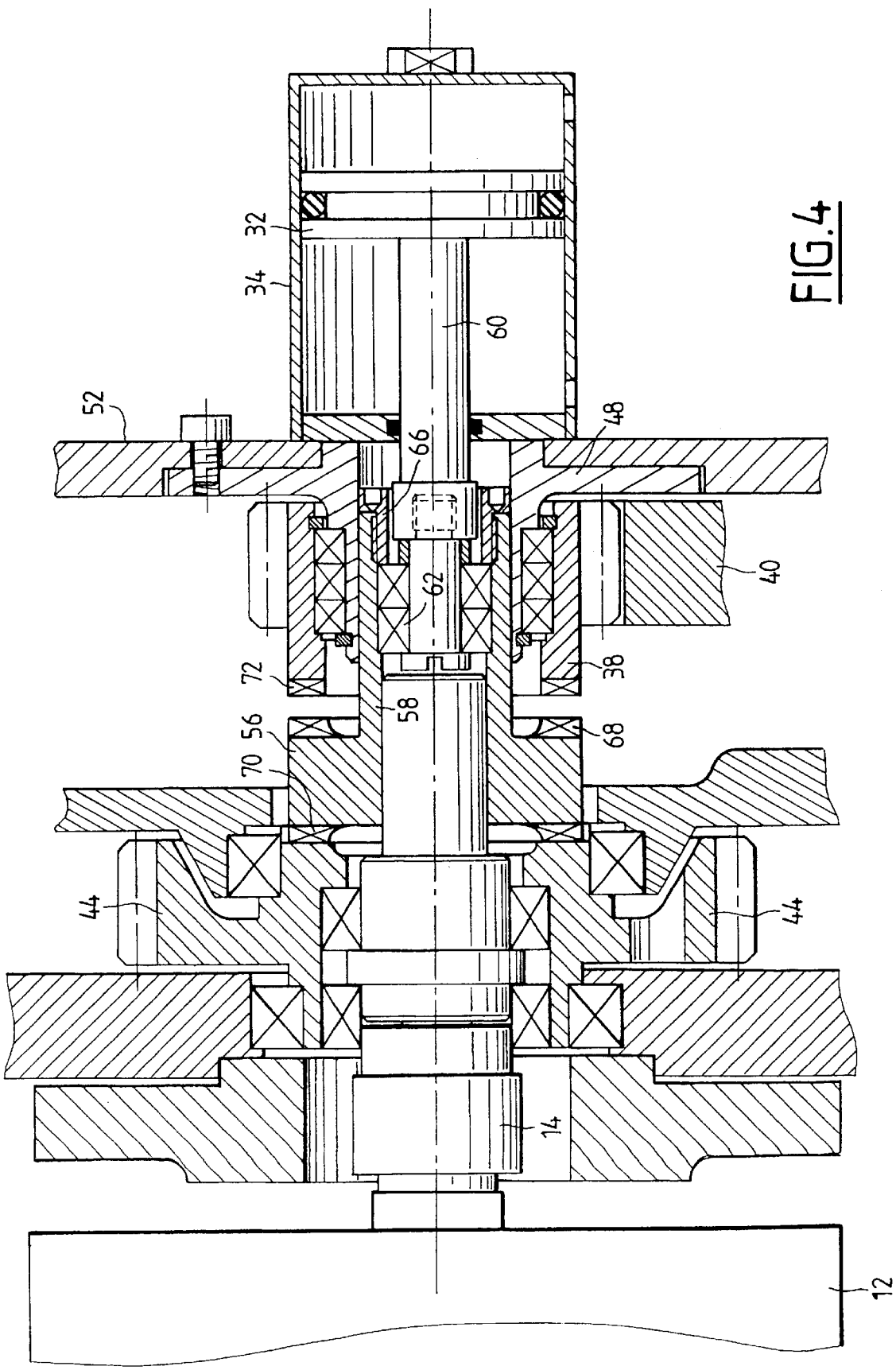
FIG. 4 shows the gear mechanism shown in FIG. 3 in a second position.

FIGS. 2 and 3 show the gear mechanism in a first position corresponding to a first rotation speed of the driven shaft 16 and FIG. 4 shows the gear mechanism in a second position corresponding to a second rotation speed of that shaft.

These figures show that the first train of toothed wheels includes five toothed wheels 38, 40, 42, 44 and 46 which engage with each other in succession and that the secondary set of toothed wheels consists of the two toothed wheels 44 and 46 of the primary set of toothed wheels.

The toothed wheels 38 and 44 at the end of the kinematic system of the first and second sets of wheels, i.e. the wheels 38 and 44 nearest the driving shaft 14, can rotate freely relative to the driving shaft 14.

The end wheel 38 of the primary set of toothed wheels is mounted on a fixed flange 48 by means of a set of bearings 50, the flange 48 being fixed to a casing 52.

The end toothed wheel 44 of the secondary set of toothed wheels is mounted on the driving shaft 14 on a set of bearings 54.

The positive clutch 56 is constrained to rotate with the driving shaft 14 and is mobile axially relative thereto between two end positions referred to previously and shown in FIGS. 2 and 4, respectively, to drive rotation of one or other of the toothed wheels 38 and 44 of the two sets of toothed wheels.

These figures show that the positive clutch 56 has an axial skirt 58 extending towards the piston rod 60 of the piston 32 and constrained to move in translation with it.

To this end, a bearing 62 held between the head of a screw 64 carried by the free end of the piston rod 60 and a spacer 66 fastened to the inside face of the skirt 58 enables relative rotation of the positive clutch 56 and the piston 32.

Note that the positive clutch 56 has radial teeth 68 and 70 in two mutually facing larger faces of the positive clutch respectively facing the end wheels 38 and 44 of the primary and secondary sets.

The teeth 68 and 70 cooperate with corresponding radial teeth 72 and 74 carried by the wheels 38 and 44.

In operation, and depending on the position of the positive clutch 56, the latter either drives the end wheel 38 of the primary set of toothed wheels or drives S the toothed wheel 44 of the secondary set directly.

It is therefore possible to vary the rotation speed of the driven shaft 16 under the control of the central unit 20 by controlling the movement of the piston 32 within the chamber 34 to obtain either a first gear ratio, in the position of the positive clutch 56 shown in FIGS. 2 and 3 in which the positive clutch 56 is engaged with the end wheel 38 of the primary set of toothed wheels to drive the driven shaft 16 via the first and second sets of toothed wheels, or a second gear ratio by positioning the positive clutch 56 in the position shown in FIG. 4 in which it is engaged with the end toothed wheel 44 of the secondary set of toothed wheels.

Accordingly, to bore a workpiece consisting of an assembly of different layers of different materials, for example aluminium, titanium, carbon, etc., of predefined thicknesses, for example, the central unit 20 uses a specific program stored in its memory to control data representative of the advance of the tool supplied by the corresponding position sensor and, where appropriate, data supplied by a sensor identifying the tool type, the rotation speed of the driven shaft 16 and the advance of the tool, to adapt the machining speed to the layer currently being bored.

The central unit 20 advantageously stores in its memory an algorithm for monitoring the rotation speed of the driven shaft 16 which compares the actual speed of the tool and a range of permissible rotation speeds including the imposed rotation speed in order to perform a standard safety procedure if the imposed rotation speed is outside permitted limits.

For example, the upper limit of the permissible speed range is equal to 100% of the imposed speed and the lower limit to 50% of the imposed speed.

The figures finally show that the machine tool is preferably provided with an axial lubrication unit 76 of a standard type, under the control of the central unit 20 and able to inject a lubricant into the driven shaft 16 by means of a tube sliding therein.

Note finally that the toothed wheel mechanism just described constitutes a removable and interchangeable assembly.

If it is required to modify the demultiplication ratio of the first set of toothed wheels or to drive the driven shaft 16 with no demultiplication, all that is required is to take off the cover 80 covering the toothed wheel mechanism, take off the cap 52 and replace or even remove the toothed wheels 38 to 42, and place a driver on the wheel 44.

Figure 5:
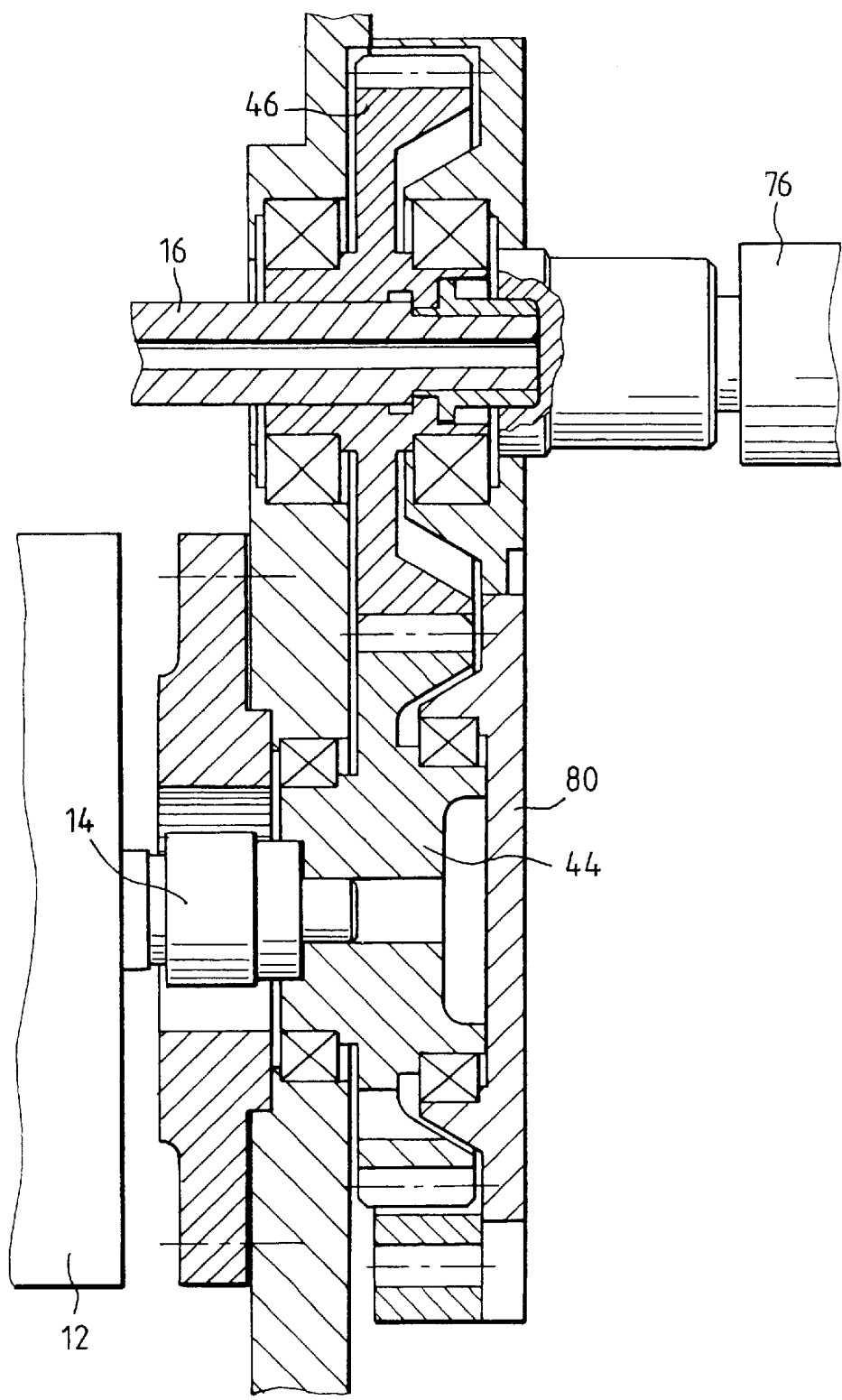
FIG. 5 shows the gear mechanism shown in FIG. 2 after eliminating some of the gears of the primary set of toothed wheels, to retain a single gear train.

Accordingly, as shown in FIG. 5, if it is required to drive the driven shaft 16 directly, with no demultiplication, the toothed wheels 38 to 42 are removed and a cap 80 is fitted to cover the driving shaft 14.

A single-speed machine tool which is light in weight is obtained in this way.

What is claimed is:

1. Pneumatic machine tool, comprising:

a driving shaft (14) driven in rotation by pneumatic drive means (12), a driven tool-carrier shaft (16), a gear mechanism (18) disposed between the driving shaft (14) and the driven shaft (16) to drive the driven shaft, a set of sensors (22) for measuring operating parameters of the machine tool, and a central control unit (20) in which are stored algorithms for controlling machining as a function of data received from the sensors (22), the gear mechanism including means (24, 26, 28, 30, 36) for changing the gear ratio under the control of the central unit (20), the gear mechanism including primary and secondary sets (24, 26) of toothed wheels with different demultiplication ratios, each adapted to rotate freely relative to the driving shaft (14), the speed changing means including a positive clutch (28, 56) constrained to rotate with the driving shaft (14) and axially mobile relative thereto under the control of a pneumatic control unit (30) controlled by the central unit (20), between a first end position, in which the positive clutch is engaged with the primary set of toothed wheels so that the driving shaft drives the driven shaft at a first gear ratio, and a second end position, in which the positive clutch is engaged with the secondary set of toothed wheels so that the driving shaft drives the driven shaft at a second gear ratio.

2. Pneumatic machine tool according to claim 1, characterized in that the secondary set (24) of toothed wheels is part of the primary set (26) of toothed wheels.

3. Pneumatic machine tool according to claim 1, characterized in that the positive clutch (28, 56) has radial teeth (68, 70) on opposite end faces of the positive clutch adapted to cooperate with complementary radial teeth (72, 74) carried by one of the toothed wheels of each set of toothed wheels.

4. Pneumatic machine tool according to claim 1, characterized in that the pneumatic control unit includes a piston (32) fastened to the positive clutch and mobile in a chamber (34) and means for supplying the chamber with pressurized fluid on either side of the piston, including a solenoid valve (36) under the control of the central unit.

5. Pneumatic machine according to claim 1, characterized in that at least part of the gear mechanism (18) is removable from the machine and constitutes an interchangeable modular assembly.

6. Pneumatic machine according to claim 1, characterized in that the central unit (20) has stored in its memory an algorithm for monitoring the rotation speed of the driven shaft (16) by comparing the actual rotation speed of the driven shaft and maximum and minimum permissible rotation speeds between which lies the rotation speed imposed by the central unit (20).

7. Pneumatic machine according to claim 1, characterized in that the primary set (24) of toothed wheels is a speed multiplier or reducer.

* * * * *

UNITED STATES PATENT AND TRADEMARK OFFICE
CERTIFICATE OF CORRECTION

PATENT NO. : 6,343,900 B1
DATED : February 5, 2002
INVENTOR(S) : Bruno Piergiacomi It is certified that error appears in the above-identified patent and that said Letters Patent is hereby corrected as shown below:

<u>Title page,</u>
Item [12], amend to read as follows: -- [12] Piergiacomi --.
Item [75], amend to read as follows: -- [75] Inventor: Bruno Piergiacomi, Yerres (FR) --.

Signed and Sealed this

Thirtieth Day of April, 2002

Attest:

Attesting Officer

JAMES E. ROGAN
Director of the United States Patent and Trademark Office